(No Model.)

I. C. HIMMER.
ELECTRIC BATTERY.

No. 292,310. Patented Jan. 22, 1884.

WITNESSES
Wm A. Skinkle
Jos. S. Latimer

INVENTOR
Ida C. Himmer
By her Attorneys
Pope Edgecomb & Butler

UNITED STATES PATENT OFFICE.

IDA C. HIMMER, OF NEW YORK, N. Y.

ELECTRIC BATTERY.

SPECIFICATION forming part of Letters Patent No. 292,310, dated January 22, 1884.

Application filed May 11, 1883. (No model.)

*To all whom it may concern:*

Be it known that I, IDA C. HIMMER, a citizen of the United States, residing at New York, in the county and State of New York, have invented certain new and useful Improvements in Electric Batteries, of which the following is a specification.

My invention relates to certain improvements in the construction and organization of various parts of a galvanic battery; and it particularly relates to the class of batteries in which carbon plates are employed as the electro-negative element and a zinc rod or plate as the electro-positive element, and a solution of sal-ammoniac or chloride of ammonia is employed as the excitant.

The object of the invention is to construct a battery of this character employing more than one carbon plate or rod in such a manner that the plates may be placed in electrical connection with each other and with the terminal of an external circuit in such manner as to avoid all corrosion of the parts of the battery, and also to provide means for preserving the amalgamation of the zinc element of the battery.

The invention consists in supporting an annular series of carbon rods within a suitable jar or cell, and in securing an electrical connection between the several rods thus supported by means of a connecting-plate of the same material. One of the carbon rods is provided with a metallic or conducting cup or thimble, which fits over the top of the same, and is secured thereto by means of suitable metallic pins. The zinc electrode extends between the rods and through the annular connecting-plate, and carries at its lower extremity a suitable cup or thimble for containing a quantity of mercury. This cup is provided with a lid, of cork or other suitable material which will not be acted upon by the exciting agent of the battery, by means of which the cup is attached to the zinc. Suitable apertures are formed through this cover for permitting the mercury to escape from the cup and amalgamate with the surface of the zinc electrode.

Figure 1:
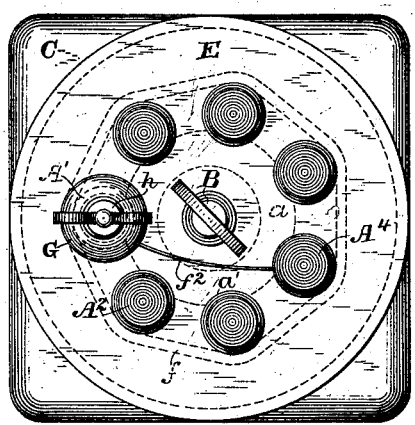
Figure 2:
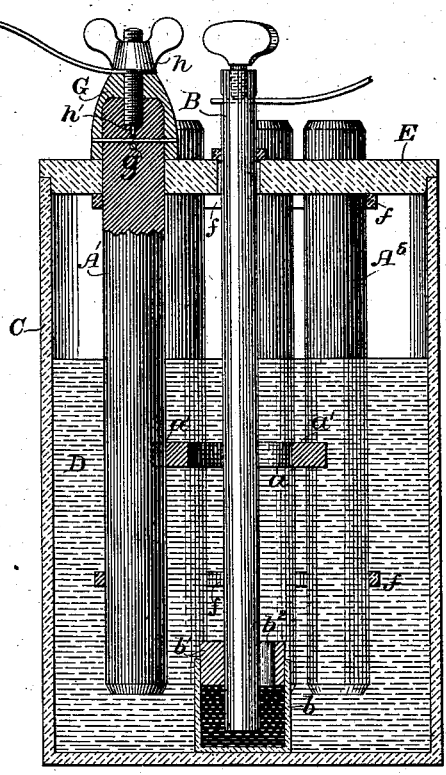
Figure 3:
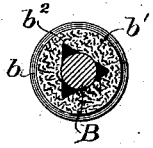

In the accompanying drawings, which illustrate my invention, Figure 1 is a plan view of a battery embodying my invention, and Fig. 2 is a vertical cross-section of the same. Fig. 3 illustrates certain details in the construction of the mercury-cup.

Referring to the drawings, A $A^2$, &c., represent a series of carbon rods, together constituting a single element of the battery, and B represents a zinc rod constituting the positive element of the same. The object of employing several rods A instead of one plate is to expose as great a surface of the element as practicable to the fluid.

C represents a suitable non-conducting jar or cell for containing the plates A and B and a liquid excitant, (shown at D,) and preferably consisting of a solution of chloride of ammonia. The carbon rods A are rigidly supported from a cover, E, which may be of carbon or of non-conducting material. They are in electrical connection with each other through a carbon ring, $a$. The periphery of the ring $a$ is preferably constructed with equidistant circular indentations $a'$, for receiving the carbon rods A, between which it is placed. I prefer to locate the ring $a$ at a point about midway between the upper and lower extremities of the rod A and beneath the surface of the liquid excitant, for the purpose of obtaining a more perfect electrical connection. It is securely held in this position by means of elastic bands $f$, embracing the rods A, or by other suitable means.

At the upper extremity of one of the carbon rods, A', is secured a thimble, G, by means of which a reliable electrical connection may be made therewith. The thimble G is preferably molded into the proper form to fit over the top of the carbon rod A', and it is secured thereto by means of platinum pins $g$, extending through the metal and into the rod. Extending vertically through the upper portion of the thimble G is a binding-post, $h$, carrying at its inner extremity a platinum pin, $h'$, which pin enters the top of the rod A'. By means of the metallic thimble G and the platinum connecting-pin $h'$, a reliable electrical connection is secured with the carbon plate A', and through the ring $a$ with all the rods in series. For the purpose, however, of providing better against any interruption between the connections of the various rods A, I prefer in some instances to connect one of the rods—A⁴, for instance, which is opposite the rod A'—with the latter by means of a conducting-wire, f², preferably of platinum.

The zinc electrode B carries at its lower extremity a cup, $b$, of glass, porcelain, or other suitable material, for containing a quantity of mercury. The cup $b$ is provided with a cover, $b'$, of cork, rubber, or other suitable material which will withstand the action of the battery-fluid, and at the same time permit of sufficient compression to bind the rod and cup together. For the purpose of permitting the mercury contained in the cup to be absorbed or drawn upward as rapidly as it is required to form an amalgam with the zinc constituting the surface of the plate, the aperture $b^2$ in the cover $b$ is preferably constructed with a triangular cross-section, thereby leaving suitable angular apertures through which the mercury may be drawn from the cup as required. In this manner the mercury within the cup is prevented from escaping therefrom when the jar is moved from place to place, but may be absorbed as required by the zinc, as already set forth.

Instead of constructing the thimble G of conducting material, a non-conducting cap may be employed in some instances for supporting the binding-post, and the latter connected with the carbon rod by means of suitable platinum-wire connections.

As before mentioned, it may be found desirable in some instances to construct the cover or support E of carbon instead of non-conducting material. The zinc electrode B should then be insulated therefrom in any suitable manner. The annular plate $a$ may or may not be employed in connection with such a cover. By thus constructing the support of the same material as the rods A, no chemical action will take place between the parts, and corrosion will be avoided.

I am aware that a carbon battery element has been made by slotting a cylinder, so as to form a row or cluster of connected bars, and I make no claim to such construction.

I claim as my invention—

1. The combination, substantially as hereinbefore set forth, with a series of separate carbon plates or rods, of a carbon ring or plate in contact with each of said rods, and a zinc electrode extending through said ring or plate.

2. The combination, substantially as hereinbefore set forth, of a series of carbon rods or plates constituting a battery element, a separate ring or plate of the same material electrically connecting said rods or plates at a point below the surface of the exciting-fluid, and a non-conducting jar-cover forming a support for said rods or plates.

3. The combination, substantially as hereinbefore set forth, of an annular series of carbon rods constituting a battery element, a carbon ring supported within said series and in electrical contact with each of said rods, a zinc electrode extending through said carbon ring, and a mercury-reservoir attached to the extremity of said zinc electrode.

4. The combination, substantially as hereinbefore set forth, of an annular series of carbon rods constituting a battery element, a jar-cover forming a support for said rods, a carbon ring beneath the surface of the exciting-fluid, electrically connecting said rods, a conducting thimble or cap united with the upper extremity of one of said rods, and means, substantially such as described, for securing an electric conductor to said thimble.

5. The combination, substantially as hereinbefore set forth, of a zinc electrode, a non-conducting mercury-reservoir having a perforated cover, which serves both to connect said reservoir with the lower extremity of said electrode and to permit a gradual escape of the mercury contained therein.

6. The combination, substantially as hereinbefore set forth, of the carbon rods A' A², &c., the carbon plate or ring $a$, the electrode B, the cup $b$, and the cover $b'$.

In testimony whereof I have hereunto subscribed my name this 23d day of April, A. D. 1883.

IDA C. HIMMER.

Witnesses:
DANIEL W. EDGECOMB,
CHARLES A. TERRY.